United States Patent Office 3,427,343
Patented Feb. 11, 1969

3,427,343
PROCESS FOR PREPARING OLEFINICAL-
LY UNSATURATED ALDEHYDES AND
NITRILES
James L. Callahan, Bedford, Ernest C. Milberger, Maple Heights, and Robert K. Grasselli, Garfield Heights, Ohio, assignors to The Standard Oil Company, Cleveland, Ohio, a corporation of Ohio
No Drawing. Filed Nov. 4, 1964, Ser. No. 408,723
U.S. Cl. 260—465.3                         12 Claims
Int. Cl. C07c 45/04, 121/02

The present invention relates to an improvement in the process for the manufacture of olefinically unsaturated nitriles or aldehydes by the reaction of oxygen, or ammonia and oxygen, with an olefin. The present invention more particularly pertains to an improvement in the manufacture of an olefinically unsaturated aldehyde such as acrolein by a process which involves the catalytic vapor phase reaction of oxygen and propylene and an improvement in the manufacture of an olefinically unsaturated nitrile such as acrylonitrile by a process which involves the catalytic vapor phase reaction of ammonia, oxygen and propylene in a plurality of series of communicating reaction compartments or zones containing a fluidized catalyst wherein the oxygen is introduced at a point which is at least one reaction compartment or zone upstream from the compartment or zone in which the other reactants are introduced. The present process may be carried out continuously for long periods of time without the necessity for the shut-down and catalyst regeneration usually required in such processes. In the present process the catalyst maintains its excellent initial activity for long periods of time which means significant economic savings on a commercial scale.

In its broadest aspect, the present process comprises contacting a mixture comprising a monoolefin having from 3 to 4 carbon atoms such as propylene and isobutylene, molecular oxygen and optionally ammonia with a fluidized solid catalyst at an elevated temperature, at atmospheric or near atmospheric pressure in a plurality of semi-isolated fluidized beds. The molecular oxygen always contacts the fluidized catalyst in the substantial absence of the monoolefin and ammonia in a compartment which is at least one compartment upstream from and in series with the reaction zone.

The preferred reactants in this invention are a monoolefin having the structure

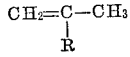

wherein R is a member selected from the group consisting of hydrogen and a methyl radical such as propylene or isobutylene, molecular oxygen and optionally ammonia. When the product desired is an olefinically unsaturated aldehyde such as acrolein or methacrolein, no ammonia is employed in the reaction mixture. On the other hand, when the desired product is an olefinically unsaturated nitrile such as acrylonitrile or methacrylonitrile, ammonia is included in the reaction mixture. Thus, the present process is an oxidation process which produces olefinically unsaturated aldehydes in the absence of ammonia and olefinically unsaturated nitriles in the presence of ammonia.

Any source of molecular oxygen may be employed in the instant process. The molar ratio of oxygen to olefin in the reaction mixture should be in the range of 0.5:1 to 5:1 and a ratio of about 1:1 to 2:1 is preferred.

The presence of saturated hydrocarbons, propane or n-butane, for instance, in the feed mixture does not appear to influence the reaction to any appreciable degree and these materials appear to act only as diluents. Consequently, the presence of saturated hydrocarbons in the feed to the reactor is contemplated to be within the scope of this reaction. Similarly, other inert gaseous diluents such as nitrogen and the oxides of carbon may be present in the reaction mixtures without deleterious effect.

In the preparation of olefinically unsaturated nitriles the molar ratio of ammonia to olefin in the feed may vary between about 0.05:1 to 5:1. There is no real upper limit for the ammonia-olefin ratio. At ammonia-olefin ratios appreciably less than the stoichiometric ratio of 1:1, various amounts of oxygenated derivatives of the olefin will be formed.

The use of water in the reaction mixture is within the scope of the present process. Improvements have been observed in reactions carried out in the presence of water as compared to similar runs made in the absence of added water. Consequently, the presence of water has a marked beneficial effect on this reaction, but reactions not including water in the reaction mixture are not meant to be excluded from this invention.

In general, if water is to be included in the reaction mixture, the molar ratio of water to olefin should be at least about 0.25:1. Ratios on the order of 1:1 are particularly desirable but higher ratios may be employed, i.e., up to about 10:1. Because of the recovery problems involved, it is generally preferred to use only so much water as is necessary to obtain the desired improvement in yield. It is to be understood that water does not behave only as a diluent in the reaction mixture, although the exact manner in which the water affects the reaction is not understood.

Other inert diluents, such as nitrogen and carbon dioxide may be present in the reaction mixture; however, no beneficial effect on the reaction has been observed in the presence of such diluents.

Any one or more of several catalysts which will function in the reaction between propylene, oxygen and optionally ammonia to produce acrolein or optionally acrylonitrile are useful in the present process. A particularly desirable group of catalysts for the purpose of the present process which are more fully disclosed in U.S. Patents Nos. 2,904,580, 3,044,966, 3,050,546 and 2,941,007, are the bismuth, tin and antimony salts of phosphomolybdic acid and molybdic acids, bismuth silicomolybdate, bismuth silicophosphomolybdate, and bismuth phosphotungstate, and of these, a bismuth phosphomolybdate is preferred. Other catalysts which are useful in the present invention include the combined oxides of bismuth and molybdenum, bismuth, molybdenum and optionally phosphorous, promoted by the addition of the oxides of barium and silicon, and the combined oxides of antimony and tin. Particularly useful in the present invention are the combined oxides of antimony and another polyvalent metal oxide and most preferred are the combined oxides of antimony and uranium, antimony and iron, antimony and thorium, antimony and cerium, and antimony and manganese as well as promoted and attrition resistant catalysts of this type which are disclosed in the copending U.S. patent applications of J. L. Callahan, B. Gertisser and J. J. Szabo, Ser. No. 190,038, filed Apr. 25, 1962, now U.S. Patent No. 3,248,340, and Ser. No. 197,932, filed May 28, 1962, now U.S. Patent No. 3,186,955; those of J. L. Callahan and B. Gertisser, Ser. Nos. 201,321 and 201,329, filed June 11, 1962, both now abandoned and Ser. Nos. 230,684, 230,717 and 230,741, filed Oct. 15, 1962, now U.S. Patent Nos. 3,200,081, 3,200,084 and 3,264,225, respectively; those of J. L. Callahan, R. K. Grasselli and W. R. Knipple, Ser. Nos. 311,360 (now abandoned) and 311,657, filed Sept. 26, 1963, now U.S. Patent No. 3,328,315; and the application of J. L. Callahan and W. R. Knipple, Ser. No. 279,308, filed May 9, 1963, now U.S. Patent No. 3,341,471.

Still other catalysts which are useful in the process of the present invention are disclosed in Belgian Patents Nos. 592,434, 593,097, 598,511, 603,030, 612,136, 615,605 and 603,031; Canadian Patent No. 619,497; French Patent No. 1,278,289; British Patents Nos. 874,593 and 904,418; and U.S. Patent No. 2,481,826.

The catalyst may be prepared by any of the numerous methods of catalyst preparation which are known to those skilled in the art. For instance, the catalyst may be manufactured by co-gelling the various ingredients. The co-gelled mass may be dried in accordance with conventional techniques. The catalyst may be spray dried, extruded as pellets or formed into spheres in oil as is well known in the art. Alternatively, the catalyst components may be mixed with a support in the form of a slurry followed by drying, or may be impregnated on silica or other support. The catalyst may be prepared in any convenient form and preferably as small particles suitable for use in the fluidized bed reactor. For the purpose of this invention, a catalyst having a particle size between 1 and 500 microns is preferred. Also, for the purpose of the present invention, the catalysts which are preferred are those composed of an oxide of antimony and the oxide of another polyvalent metal and more preferably, the catalyst composed of the combined oxides of antimony and uranium, antimony and iron, antimony and tin, antimony and thorium, antimony and cerium and antimony and manganese.

The temperature at which the instant process is conducted may be any temperature in the range of 500 to 1000° F. The preferred temperature range is from about 705 to 950° F.

The pressure at which the reaction is conducted is also an important variable, and the reaction should be carried out at about atmospheric or slightly above atmospheric (2 to 3 atmospheres) pressure. In general, high pressures, i.e., above 250 p.s.i.g., are not suitable for the process since higher pressures tend to favor the formation of undesirable by-products.

The apparent contact time employed in the process is not especially critical. Contact time in the range of 0.1 to 50 seconds may be employed. The apparent contact time is defined as the length of time in seconds which a unit volume of gas measured under the conditions of reaction is in contact with the apparent unit volume of catalyst. The apparent contact time may be calculated, for instance, from the apparent volume of the catalyst bed, the average temperature and pressure of the reaction, and the flow rates in the vessel of the components of the reaction mixture. The optimum contact time will, of course, vary depending upon the olefin being treated; but, in general, it may be said that a contact time of 1 to 15 seconds is preferred.

In general, the apparatus suitable for carrying out the instant process is one suitable for the contacting of vapors with a suspended particulate solid. The present process may be carried out either continuously or intermittently although it is preferred that it be carried out continuously for economic reasons. The reactor used in the present process must be made up of at least two and preferably at least three chambers, compartments or zones which communicate with one another and are separated one from the other by at least one and preferably at least two foraminous members. The chambers, compartments or zones are preferably connected in series in a vertical relationship as opposed to a parallel or horizontal relationship. The bottom zone must be equipped with means for introducing molecular oxygen thereinto and there must be means for introducing the other reactants in a zone above or downstream from the said bottom zone. The volume of the reactor below the zone wherein the other reactant or reactants are introduced should be from 5 to 75% and preferably from 10 to 60% of the total reactor volume. More preferred is the process carried out in a reactor of the foregoing type having at least four compartments or zones, each communicated with and being separated from the next adjacent one by a foraminous member.

The preferred apparatus comprises a column containing a series of foraminous members or perforated trays stacked horizontally through the length of the column. The perforations in the trays, gas velocities and particle size of the catalyst are sufficiently controlled to give a self-regulating type of reaction of optimum conversions and yields. A critical feature of the apparatus useful in the present invention is the presence therein of a first gas inlet at or near the very bottom thereof for the introduction of the molecular oxygen into the reactor and at least one second gas inlet which is in another reaction compartment above or downstream from the compartment containing said first gas inlet, said second gas inlet being present for the introduction of the olefin and optionally the ammonia into the apparatus. Preferably, the compartment containing the first gas inlet should have at least one reaction compartment between it and the compartment containing said second gas inlet.

The reactor is preferably a vertically mounted, flat, round or cone bottom tube constructed of metal, such as stainless steel, or other suitable material and closed at the bottom. Near to and up from the bottom of the tube there may be transversely mounted one or more reactant gas distribution grids or distribution "spiders" as is well known in the art. This distribution grid may serve both as a catalyst support and as a sparging grid for air or oxygen which is introduced below the grid.

The foraminous members which separate one communicating reaction compartment or zone from another in the reaction area may be mounted transversely within the reactor and may be screens, gratings, perforated plates, cones or pyramidal-shaped plates or more than one of these types or others. More details concerning the numerous types and arrangements of openings in the plates defining the reaction compartment will be found in U.S. Patents 2,433,798; 2,730,556; 2,740,698; 2,893,219; 2,847,360; 2,893,849 and 2,893,851 and in the article appearing in the A.I. Ch. E. Journal, 5, 540–60 (March 1959).

The types of openings in the foraminous members may be widely varied, the only requirement being that at least some of the openings be large enough to allow passage of the catalyst and reactants through them. It is preferred that the openings in the foraminous members be rectangular, triangular, circular or oval in shape and that the size of the openings be within the limits of from about 0.125 to 3 inches in diameter. The optimum of this range will vary, of course, depending upon the size of the reactor. More details concerning the numerous types and arrangement of openings in the foraminous members useful herein will be found in U.S. Patents Nos. 2,433,798, 2,740,698, 2,893,849, 2,893,851; and the aforementioned article appearing in the A.I. Ch. E. Journal.

The amount of the open area in the foraminous members may vary so long as it is within the limits of from 7.5 to 50% of the total internal cross-sectional area of the reactor. For more details concerning the open area in the foraminous members useful in the present invention see U.S. Patents Nos. 2,433,798, 2,893,849 and 2,893,851.

As has been pointed out earlier, the spacing of the foraminous members in the reactor (stated differently, the relative sizes of the reaction compartments or zones) is not a critical feature of the present invention. Many types of spacing and arrangement of the foraminous members may be used and more details concerning spacing will be found in U.S. Patents Nos. 2,471,085, 2,893,219, 2,893,849, and 2,989,544. It is, however, preferred that the distance between any two foraminous members be at least about one inch and no greater than about three times the inside diameter of the reactor. It is more highly preferrde for a given reaction compartment that the height be no greater than about two diameters of the internal cross-section of the compartment.

It is often desirable and actually preferred to include heat exchanger coils or tubes within the reaction compartments for better temperature control during the reaction. Such an arrangement is typified in U.S. Patents Nos. 2,676,668 and 2,893,851.

Because, as in most fluidized bed reactors the catalyst fines often tend to be elutriated to some extent from the top of the reactor during the course of the reaction, it is convenient to expand the upper section of the reactor so that it acts as a disengaging section and it is often desirable to include at the top of the reactor means such as a cyclone or cyclones for recovering most or all of the catalyst fines, as disclosed in U.S. Patents Nos. 2,494,614, 2,730,556, 2,893,849 and 2,893,851. In addition to the recovery of catalyst fines at the top of the reactor, it is also often convenient and highly desirable to recycle the recovered catalyst fines through the reaction compartments by reintroducing them at a point near the bottom of the reactor, as disclosed in U.S. Patents Nos. 2,494,614, 2,847,360 and in the aforementioned article appearing in the A.I. Ch. E. Journal. The catalyst fines may be recovered and recycled, for instance, by employing a filter and one or more cyclones or centrifuges at the upper portion of the reactor and a dip-leg for reintroducing the recovered catalyst into the bottom or near the bottom of the reactor.

The reactor may be brought to the reaction temperature before or after the introduction of the reaction feed mixture. In a large scale operation, it is preferred to carry out the process in a continuous manner, and in such a system, the recirculation of the unreacted olefin and ammonia if it be present is contemplated.

The reactor is, in essence, a sequence of several fluid beds with very limited back-flow of vapor. Each reaction compartment is a nearly prefectly stirred reactor in which the gases being contacted experience a very short contact time. Because this contact time is short, contact time distribution is also very sharp. The effect of multiplying this short, sharp contact time over several reaction compartments in the instant novel process is to produce an overall contact time distribution which is much sharper than that which could be achieved in a single conventional fluid bed reactor of the same total reaction space.

In accordance with the present invention, the gaseous reactants are not all introduced together but rather the molecular oxygen (oxygen or air usually) is introduced near the bottom and into the lowest reaction compartment in the reaction area and the other reactants are introduced into a reaction compartment which is at least one removed downstream from the reaction compartment into which the molecular oxygen is introduced. Such a process is decidedly superior to one in which all the reactants are introduced into the same reaction compartment in that the normal periodic regeneration of catalyst usually necessary in the latter is not necessary in the former. In the process of the present invention, the catalyst activity is maintained uniformly high for indefinitely long periods of time. Such is not the case when all of the reactants are introduced into the same reaction compartment. The loss of activity of catalysts of this type useful in the present process and particularly the catalysts composed of antimony oxide can be serious in that prolonged use of such catalyst without periodic regeneration not only causes conversions and yield of desired product to drop but also deterioration of catalyst may be so serious that further regeneration is impossible. Although the exact theoretical explanation for the superior results obtained in the process of the present invention is not known, these results are indeed unobvious and unexpected in view of the prior art.

In the laboratory a useful reactor was a 30-inch length of schedule 40 stainless steel pipe having an inside diameter of 3 inches and enclosed at the bottom. Near the bottom of the flat bottom reactor was a porous steel plate which served both as a catalyst support and a sparging plate for air which was introduced into the reactor just below the sparging plate and below the point at which the propylene and/or ammonia were introduced. The trays forming the compartments in the reactor were removable and could be spaced at variable intervals along a central ¼ inch thermocouple well. The plates were spaced by means of ⅜ inch sleeves which slipped on the thermocouple well. A nut at the bottom of the well held the whole assembly tight. The trays were cut circularly to fit with minimum clearance on the inside of the reactor. Means were provided for introducing propylene and/or ammonia at several points into reaction zones downstream from the reaction zone containing the air inlet. During operation of the oxidation process the entire reactor assembly was immersed in a temperature controlled molten salt bath.

The products of the reaction may be recovered by any of the methods known to those skilled in the art. One such method includes scrubbing the effluent gases from the reactor with cold water or an appropriate solvent to remove the products of the reaction. The efficiency of the scrubbing operation may be improved when water is employed as the scrubbing agent by adding a suitable wetting agent to the water. When molecular oxygen is used as the oxidizing agent in this process, the resulting product mixture remaining after removal of the nitriles may be treated to remove carbon dioxide while the remainder of the mixture containing the unreacted olefin and oxygen may be recycled through the reactor. When air is employed as the oxidizing agent in lieu of molecular oxygen, the residual product, after separation of nitriles and carbonyl products, may be scrubbed with a non-polar solvent, e.g., a hydrocarbon fraction, in order to recover unreacted olefin or other hydrocarbons which may have been included in the feed or formed in the reaction, and in this case, the remaining gases may be discarded. The addition of a suitable polymerization inhibitor for prevention or minimization of polymerization of the olefinically unsaturated products during the recovery steps of the instant process is also contemplated.

In the examples, conventional auxiliary equipment, including meters, were employed for carrying out the reaction, and all the data reported herein are within the usual limits of experimental accuracy for such equipment. The products of the reaction were recovered by scrubbing the effluent gases from the reactor with water or hydrochloric acid solutions. The products were analyzed by conventional means, including mass spectrographic, gas chromatographic, and infrared spectrometric analyses, as well as conventional titration where such analyses were applicable.

Throughout the specification, the following definitions are employed:

Superficial Linear Gas Velocity =

$$\frac{\text{Vol. Feed ft.}^3/\text{sec.}}{\text{Reactor Cross Sect. Area (ft.}^2)} = \text{ft./sec.}$$

$$\text{Contact Time} = \frac{\text{Reactor Height (ft.)}}{\text{Superficial Linear Gas Velocity}} = \text{sec.}$$

Percent Conversion =

$$\frac{\text{Weight of Carbon in the Products}}{\text{Weight of Carbon in the Olefin Feed}} \times 100$$

In the following illustrative examples, the amounts of the various ingredients and products are expressed as parts by weight unless otherwise indicated.

EXAMPLE I

The catalytic ammoxidation of propylene to acrylonitrile was carried out in a vertical reactor 18 inches in diameter containing ten perforated trays. The trays were spaced vertically at 1 ft. intervals. Each tray contained 3/16 inch holes and a total of 33% open area. Horizontal spiral cooling coils were located in each compartment. The reactor contained a solid particulate catalyst. Air was always introduced into the bottom of the reactor through a sparger plate which served as a tray for the catalyst and allowed little or no catalyst to pass downward through it. The propylene and ammonia were introduced either at the bottom of the reactor or according to the process of the present invention at an inlet in the third catalyst-containing compartment from the bottom of the reactor. Catalyst fines at the op of he reactor were collected by a first cyclone and returned to the bottommost catalyst-containing compartment of the reactor via an internal dip leg.

The catalyst was prepared from antimony oxide ($Sb_2O_3$) and uranium oxide ($U_3O_8$). 1935 parts of 63% nitric acid were pumped from drums into a stainless steel tank equipped with mechanical stirrers and heating coils and 575 parts of $Sb_2O_3$ were added thereto with continuous stirring. After approximately 15 hours, 242 parts of $U_2O_8$ were added to the stainless steel mixing tank. Immediately after adding the $U_3O_8$ steam was passed through the heating coils and the temperature of the mixture was brought to about 206° F. This temperature was maintained for about 2½ hours during which time a substantial quantity of the oxides of nitrogen was evolved. The temperature of the mixture was then brought down to about 140° F. and 1250 parts of tap water were added to the mixture. 680 parts of a silica sol containing 30% silica by weight (DuPont Ludox HS) were then added and the mixture was stirred for 16 hours. The pH of the mixture was then adjusted carefully with cooling to about 8.2 with 26% aqueous ammonium hydroxide. The mixture was filtered and the solid retained on the filter was dried at 250° F. for three hours, 350° F. for two hours, 410° F. for one hour and finally at 800° F. for four hours. Essentially all of the nitrates were removed from the catalyst by this treatment. The catalyst was then calcined at 1730° F. for about 8 hours and the resulting material was ball-milled with a slurry of the 30% silica sol. 250 parts of the foregoing solid and 275 parts of the silica sol plus an additional 8.3 parts of water were ball-milled for an eight hour period. The resulting material was spray dried. The spray dried material was calcined at a temperature of from 1450° F. to 1675° F. over a period of from 10 to 25 hours. The final catalyst had the following properties:

| | |
|---|---|
| Apparent bulk density _____g./ml__ | 1.196 |
| Compact bulk density _____g./ml__ | 1.361 |
| Pore volume _____ml./g__ | 0.218 |
| Surface area _____M²/g__ | 18 |

Particle size

| On mesh | Wt. percent |
|---|---|
| 140 | 16.0 |
| 170 | 12.4 |
| 200 | 21.2 |
| 230 | 6.6 |
| 270 | 5.5 |
| 325 | 19.0 |
| Pan | 19.1 |
| Total | 99.8 |

The effect on catalyst activity caused by introducing the propylene and ammonia into a reaction compartment above or downstream from that into which the air was introduced was determined by comparing a reaction in which the air, ammonia and propylene were all introduced into the bottommost reaction compartment (Table 1) and a reaction in which the air was introduced into the bottommost reaction compartment and the propylene and ammonia were introduced into the third catalyst-containing compartment from the bottom of the reactor (Table 2). In each reaction the molar ratio of propylene: ammonia: air was 1:1.1 to about 11. The actual amount of the air in the feed was adjusted from time to time to maintain about 2 to 3% of oxygen in the reactor effluent. A reaction temperature of about 900° F., a contact time of about 10 seconds and a reaction pressure of about 15 p.s.i.g. were maintained in each reaction.

TABLE 1

| Hours on stream | Per pass conversion of propylene to acrylonitrile |
|---|---|
| Start-up | 68.5 |
| 3 | 59.5 |
| 10 | 56.9 |

TABLE 2

| Hours on stream | Per pass conversion of propylene to acrylonitrile |
|---|---|
| 6 | 67.3 |
| 11 | 66.9 |
| 20 | 66.9 |
| 28.5 | 67.1 |
| 75 | 67.4 |
| 94 | 68.2 |

When runs of the type shown in Table 1 were extended beyond ten hours the per pass conversion of propylene to acrylonitrile continued to drop and the catalyst soon became so inactivated that it could not be regenerated even after prolonged heating in the presence of air alone.

EXAMPLE II

The procedures described in Example I were followed employing as reactants a mixture of isobutylene, ammonia and air in the mole ratio of 1:1.2:17.5, respectively. A contact time of 4.9 seconds and a reaction temperature of 900° C. were employed. In one run in which all the reactants were introduced into the lowest catalyst-containing compartment the per pass conversion of isobutylene to methacrylonitrile started out at about 50%. At the end of 1½ hours of operation the per-pass conversion of isobutylene to methacrylonitrile was only 16.2% and it was necessary at that time to shut down the reactor and regenerate the catalyst because the per-pass conversion of isobutylene to methacrylonitrile was decreasing rapidly with time on stream. In another run employing the above conditions, the air was introduced into the bottom catalyst-containing compartment and the isobutylene and ammonia were introduced into the third catalyst-containing compartment from the bottom. The initial per pass conversion of isobutylene to methacrylonitrile was greater than 50%. At the end of 29, 40 and 58 hours continuous on-stream time in this run the per pass conversion of isobutylene to methacrylonitrile was 53.8%, 56.2% and 54.3%, respectively, and the reaction could be operated at these levels of conversion for much longer periods of time.

EXAMPLE III

Results similar to those described in Example I were obtained when catalysts composed of the combined oxides of antimony and another polyvalent metal such as antimony oxide-iron oxide, antimony oxide-thorium oxide, antimony oxide-cerium oxide or antimony oxide-manganese oxide were employed in place of the antimony oxide-uranium oxide catalyst.

EXAMPLE IV

Results similar to those described in the preceding examples were obtained when ammonia was eliminated from the reaction and the predominant product was acrolein or methacrolein from propylene or isobutylene, respectively.

We claim:
1. The process for producing olefinically unsaturated nitriles or olefinically unsaturated aldehydes comprising introducing molecular oxygen into the bottom-most reaction zone of a vertical enclosed reaction area having a series of at least four communicating reaction zones con- taining a fluidized solid oxidation catalyst in each zone and introducing into a communicating zone other than that into which the molecular oxygen was introduced as reactant (a) a monoolefin having the structure

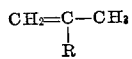

wherein R is hydrogen or methyl and ammonia or (b) a monoolefin having the structure

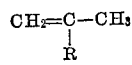

wherein R has the foregoing designation, respectively, maintaining a temperature in the range of 500 to 1000° F. throughout the reaction area and passing the reactant vapors upward through the successive zones containing fluidized catalyst and recovering the product from the top of the reaction area.

2. The process of claim 1 wherein the catalyst is composed of a mixture of antimony oxide and the oxide of at least one other polyvalent metal.

3. The process for producing olefinically unsaturated nitriles or olefinically unsaturated aldehydes comprising introducing molecular oxygen into the bottom-most reaction zone of a vertical enclosed reaction area having a series of at least four communicating reaction zones containing a fluidized solid antimony oxide containing oxidation catalyst in each zone and introducing into a communicating zone other than that into which the molecular oxygen was introduced as reactant (a) a monoolefin having the structure

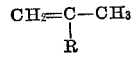

wherein R is hydrogen or methyl and ammonia or (b) a monoolefin having the structure

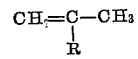

wherein R has the foregoing designation, respectively, maintaining a temperature in the range of from 705 to 950° F. and a pressure of from about 1 to 3 atmospheres throughout the reaction area and passing the reactant vapors upward through the successive zones containing fluidized catalyst, maintaining a contact time of from 0.1 to 50 seconds and recovering the product from the top of the reaction area.

4. The process of claim 3 wherein the molar ratio of oxygen to olefin is in the range of from 0.5:1 to 5:1.

5. The process of claim 4 wherein the molar ratio of ammonia to olefin is from about 0.05:1 to 5:1.

6. The process of claim 5 wherein the reactant is propylene and ammonia and the product is acrylonitrile.

7. The process of claim 5 wherein the reactant is isobutylene and ammonia and the product is methacrylonitrile.

8. The process of claim 4 wherein the reactant is propylene and the product is acrolein.

9. The process of claim 4 wherein the reactant is isobutylene and the product is methacrolein.

10. The process of claim 6 wherein the catalyst is the combined oxides of antimony and uranium.

11. The process for producing olefinically unsaturated nitriles or olefinically unsaturated aldehydes comprising introducing molecular oxygen into the bottom-most compartment of a reactor having at least four communicating compartments, in series in a generally vertical relationship, each compartment communicating with and being separated from the next adjacent one by a foraminous member, each compartment containing a fluidized solid oxidation catalyst and introducing into a compartment at least one removed from said bottom-most compartment and downstream from it, (a) a monoolefin having the structure

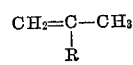

wherein R is hydrogen or methyl and ammonia, or (b) a monoolefin having the structure

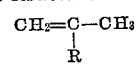

wherein has the foregoing designation, respectively, the volume between said bottom-most compartment and the point of introduction of reactant (a) or (b) being substantially free of said reactant, maintaining a temperature in the range of 500 to 1000° F. in all reaction compartments downstream of and including that compartment in which a reactant (a) or (b) has been introduced, maintaining substantially the same temperature in the compartment communicating with and immediately above said bottom-most compartment as that maintained in said reaction compartments, passing vapors of said reactant (a) or (b) upwardly through successive compartments and recovering products of reaction from the top of said reactor.

12. The process of claim 11 wherein said catalyst is a fluidized solid antimony oxide containing oxidation catalyst, said temperature is in the range 705 to 950° F. and additionally comprising maintaining a pressure of from about 1 to 3 atmospheres within said reactor and a contact time of from 0.1 to 50 seconds.

References Cited

UNITED STATES PATENTS 3,230,246    1/1966    Callahan et al. _____ 260—465.3

JOSEPH P. BRUST, *Primary Examiner.*

U.S. Cl. X.R.

260—604